United States Patent [19]
Gehman et al.

[11] Patent Number: 6,090,151
[45] Date of Patent: Jul. 18, 2000

[54] ELECTRONIC DEVICE PARAMETER ESTIMATOR AND METHOD THEREFOR

[75] Inventors: John B. Gehman, Trophy Club, Tex.; Kerry Lucille Johns-Vano, Scottsdale; Colleen Kane Steward, Mesa, both of Ariz.

[73] Assignee: Motorola, Inc., Schaumburg, Ill.

[21] Appl. No.: 08/886,745

[22] Filed: Jul. 1, 1997

[51] Int. Cl.[7] ................................................... G06F 17/50
[52] U.S. Cl. ................................... 716/5; 716/2; 716/18; 703/14; 703/18
[58] Field of Search ................................... 364/488–491, 364/578; 395/500.02–500.19, 500.35–500.4; 703/14–18; 716/1–21

[56] References Cited

U.S. PATENT DOCUMENTS

| | | | |
|---|---|---|---|
| 5,404,310 | 4/1995 | Mitsuhashi | 395/500.14 |
| 5,692,160 | 11/1997 | Sarin | 395/500.44 |
| 5,768,130 | 6/1998 | Lai | 395/500.4 |
| 5,774,367 | 6/1998 | Reyes et al. | 395/500.03 |
| 5,880,967 | 3/1999 | Jyu et al. | 395/500.07 |
| 5,883,808 | 3/1999 | Kawarabayashi | 395/500.03 |

OTHER PUBLICATIONS

Pant et al. ("Device–circuit Optimization For Minimal Energy And Power Consumption In Cmos Random Logic Networks", Proceedings of the 34th Design Automation Conference, Jun. 9, 1997, pp. 403–408).

Shen et al. ("CB–Power: a hierarchical cell–based power characterization and estimation environment for static CMOS circuits", Proceedings of the ASP–DAC '97, Asia and South Pacific Design Automation Conference, pp. 189–194, Jan. 1, 1997.

Tsui et al. ("Efficient estimation of dynamic power consumption under a real delay model", Proceeding of the 1993 IEEE/ACM International Conference on Computer–Aided Design, pp. 224–228, Jan. 1, 1993).

Borah et al. ("Transistor sizing for low power CMOS circuits", IEEE Transactions on Computer–Aided Design of Integrated Circuits and Systems, vol. 15, No. 6, pp. 665–671, Jun. 1, 1996).

*Primary Examiner*—Paul R. Lintz
*Assistant Examiner*—Phallaka Kik
*Attorney, Agent, or Firm*—George J. Gorrie; Sharon K. Coleman

[57] ABSTRACT

A process (20) and design tool (62) are presented for the accurate prediction of design parameters (42) for components (38) of an integrated circuit (22) during the early stages of the design of that integrated circuit (22). These predicted design parameters (42) include pin count parameters (50), propagation delay parameters (52), layout area parameters (54), dynamic power parameters (56), static power parameters (58), and total power parameters (60). With these parameters, the designer interactively modifies the design prior to the layout and prototyping of the integrated circuit (22). The dynamic power parameters (56) and total power parameters (60) may be repetitively predicted with differing input items to establish a power usage pattern for the integrated circuit (22).

18 Claims, 6 Drawing Sheets

| COMPONENTS | | | COMP. 1 | COMP. 2 | ADDCLAV | ETC. |
|---|---|---|---|---|---|---|
| POWER COEFFICIENTS | VARIABLE TYPE CODES | | $V_P$-TYPE | $V_P$-TYPE | 0 | ETC. |
| | | | $W_P$-TYPE | $W_P$-TYPE | 5 | ETC. |
| | | | $X_P$-TYPE | $X_P$-TYPE | 1 | ETC. |
| | | | $Y_P$-TYPE | $Y_P$-TYPE | 4 | ETC. |
| | | | $Z_P$-TYPE | $Z_P$-TYPE | 0 | ETC. |
| | CONSTANTS | | $c_{P0}$ | $c_{P0}$ | 4.7142E-11 | ETC. |
| | | | $c_{P1}$ | $c_{P1}$ | 1.7356E-09 | ETC. |
| | | | $c_{P2}$ | $c_{P2}$ | -3.0547E-08 | ETC. |
| | | | $c_{P3}$ | $c_{P3}$ | 2.1200E-13 | ETC. |
| | | | $c_{P4}$ | $c_{P4}$ | -1.0000E-09 | ETC. |
| | | | $c_{P5}$ | $c_{P5}$ | 2.0294E-09 | ETC. |
| | | | $c_{P6}$ | $c_{P6}$ | 1.1592E-09 | ETC. |
| | | | $c_{P7}$ | $c_{P7}$ | 1.0000E+00 | ETC. |
| | | | $c_{P8}$ | $c_{P8}$ | 0.0000E+00 | ETC. |
| | | | $E_{P0}$ | $E_{P0}$ | -1.5825E-01 | ETC. |
| | | | $E_{P1}$ | $E_{P1}$ | 1.3080E+00 | ETC. |
| | | | $E_{P2}$ | $E_{P2}$ | 9.1000E-01 | ETC. |
| | | | $E_{P3}$ | $E_{P3}$ | 1.0000E+00 | ETC. |
| | | | $E_{P4}$ | $E_{P4}$ | 1.1150E+00 | ETC. |
| | | | $E_{P5}$ | $E_{P5}$ | 1.0000E+00 | ETC. |
| LAYOUT AREA COEFFICIENTS | VARIABLE TYPE CODES | | $X_A$-TYPE | $X_A$-TYPE | 1 | ETC. |
| | | | $Y_A$-TYPE | $Y_A$-TYPE | 0 | ETC. |
| | CONSTANTS | | $c_{A0}$ | $c_{A0}$ | -1.70E+04 | ETC. |
| | | | $c_{A1}$ | $c_{A1}$ | 7.90E+03 | ETC. |
| | | | $E_{A0}$ | $E_{A0}$ | 0.86 | ETC. |
| | | | $E_{A1}$ | $E_{A1}$ | 1.00 | ETC. |
| PROP. DELAY COEFFICIENTS | VARIABLE TYPE CODES | | $X_D$-TYPE | $X_D$-TYPE | 1 | ETC. |
| | | | $Y_D$-TYPE | $Y_D$-TYPE | 0 | ETC. |
| | CONSTANTS | | $c_{D0}$ | $c_{D0}$ | 1.05E+01 | ETC. |
| | | | $c_{D1}$ | $c_{D1}$ | 1.90E+00 | ETC. |
| | | | $E_{D0}$ | $E_{D0}$ | 0.04 | ETC. |
| | | | $E_{D1}$ | $E_{D1}$ | 1.00 | ETC. |
| PIN COUNT COEFFICIENTS | VARIABLE TYPE CODES | | $X_K$-TYPE | $X_K$-TYPE | 1 | ETC. |
| | | | $Y_K$-TYPE | $Y_K$-TYPE | 0 | ETC. |
| | CONSTANTS | | $c_{K0}$ | $c_{K0}$ | 3 | ETC. |
| | | | $c_{K1}$ | $c_{K1}$ | 0 | ETC. |
| | | | $c_{K2}$ | $c_{K2}$ | 3 | ETC. |

FIG. 5

| | | | |
|---|---|---|---|
| PIN COUNT: | $K = C_{K2}X_K + C_{K1}Y_K + C_{K0}$ | | 122 |
| LAYOUT AREA: | $A = C_{A1}Y_A^{E_{A1}}X_A^{E_{A0}} + C_{A0}$ | | 126 |
| PROPAGATION DELAY: | $D = C_{D1}Y_D^{E_{D1}}X_D^{E_{D0}} + C_{D0}$ | | 124 |
| K | PIN COUNT | PINS | 50 |
| A | LATOUT AREA | SQUARE MICRONS | 54 |
| D | PROPAGATION DELAY | NANOSECONDS | 52 |
| $X_K, Y_K$ | COUNT VARIABLES | | 144 |
| $X_A, Y_A$ | AREA VARIABLES | | 148 |
| $X_D, Y_D$ | DELAY VARIABLES | | 146 |
| $C_{K0}, C_{K1}, C_{K2}$ | COUNT CONSTANT | | 82 |
| $C_{A0}, C_{A1}, E_{A0}, E_{A1}$ | AREA CONSTANT | | 98 |
| $C_{D0}, C_{D1}, E_{D0}, E_{D1}$ | DELAY CONSTANT | | 90 |

FIG. 6

| | | | |
|---|---|---|---|
| DYNAMIC POWER: $P_D = f_c \{ C_{P5}X_P^{E_{P0}} [C_{P1}Y_P^{E_{P1}} + C_{P2}Z_P^{E_{P3}}(C_{P7}V_P^{E_{P5}} + C_{P8}) + C_{P6}W_P^{E_{P4}}] + C_{P0} \}$ | | | 128 |
| STATIC POWER: $P_S = C_{P3}A^{E_{P2}} + C_{P4}$ | | | 132 |
| TOTAL POWER: $P_T = P_D + P_S$ | | | 134 |
| $P_D$ | DYNAMIC POWER | WATTS | 56 |
| $P_S$ | STATIC POWER | WATTS | 58 |
| $P_T$ | TOTAL POWER | WATTS | 60 |
| $f_c$ | CLOCK FREQUENCY | HERTZ | 130 |
| A | LAYOUT AREA | SQUARE MICRONS | 54 |
| $V_P, W_P, X_P, Y_P, Z_P$ | POWER VARIABLES | | 140 |
| $C_{P0}, C_{P1}, C_{P2}, C_{P3}, C_{P4},$ $C_{P5}, C_{P6}, C_{P7}, C_{P8},$ $E_{P0}, E_{P1}, E_{P2}, E_{P3}, E_{P4}, E_{P5}$ | POWER CONSTANTS | | 106 |

ELECTRONIC DEVICE PARAMETER ESTIMATOR AND METHOD THEREFOR

FIELD OF THE INVENTION

The current invention relates to the design of electronic devices. More specifically, the current invention relates to the design of electronic devices with components optimized for power consumption.

BACKGROUND OF THE INVENTION

In the design of electronic devices, e.g. integrated circuits, processors, and the like, power consumption and other parameters are significant to the design process. This is especially true when those devices are to be used in battery-powered or other equipment where power consumption is critical to operational life.

Utilizing a typical paradigm, the design of an integrated circuit passes through five levels: system, architecture, implementation, layout, and prototyping. At the system level, the designer conceives and designs the overall integrated circuit using a specific technology. At the architecture level, specific components of the integrated circuit required to realize the design, e.g. adders, RAMs, multipliers, etc., are selected from well-known building blocks peculiar to that specific technology. At the implementation level, interconnections between selected building blocks are defined to produce a homogenous circuit. At the layout level, the integrated circuit's physical topology is determined and masks are created from which the integrated circuit will be produced. Finally, at the prototype level a physical integrated circuit is produced.

Utilizing the paradigm discussed above as an example, the designer traditionally utilizes a probabilistic approach to determine power consumption and other design parameters at the system and architecture levels. That is, a composite of estimated gate count, rules of thumb, and experience-based "best guesses" are used to select components that the designer believes will fulfill the required function at the lowest power consumption.

At the layout level, conventional power analysis tools may be used to determine the probable power consumption of the integrated circuit as a whole and of each of the selected components. Verification of these probable power consumptions is performed through actual measurements of the prototype integrated circuit.

One disadvantage of this schema is its inaccuracy. Actual power consumption is often more than double that predicted by the designer during at the system and architecture level component selection. Also, since the actual power consumption is normally not discovered until the layout level, late in the design cycle, the implementation and layout design levels efforts would need to be scrapped and the designer return to the architecture level to select different components in order to make changes. This is often cost-prohibitive, resulting in undesirable compromises in the resultant integrated circuit.

What is needed is a method of accurately predicting power consumption and other design parameters at the architecture level, early in the design process, allowing the designer to objectively select the appropriate component for the task while reducing overall power consumption to a minimum.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
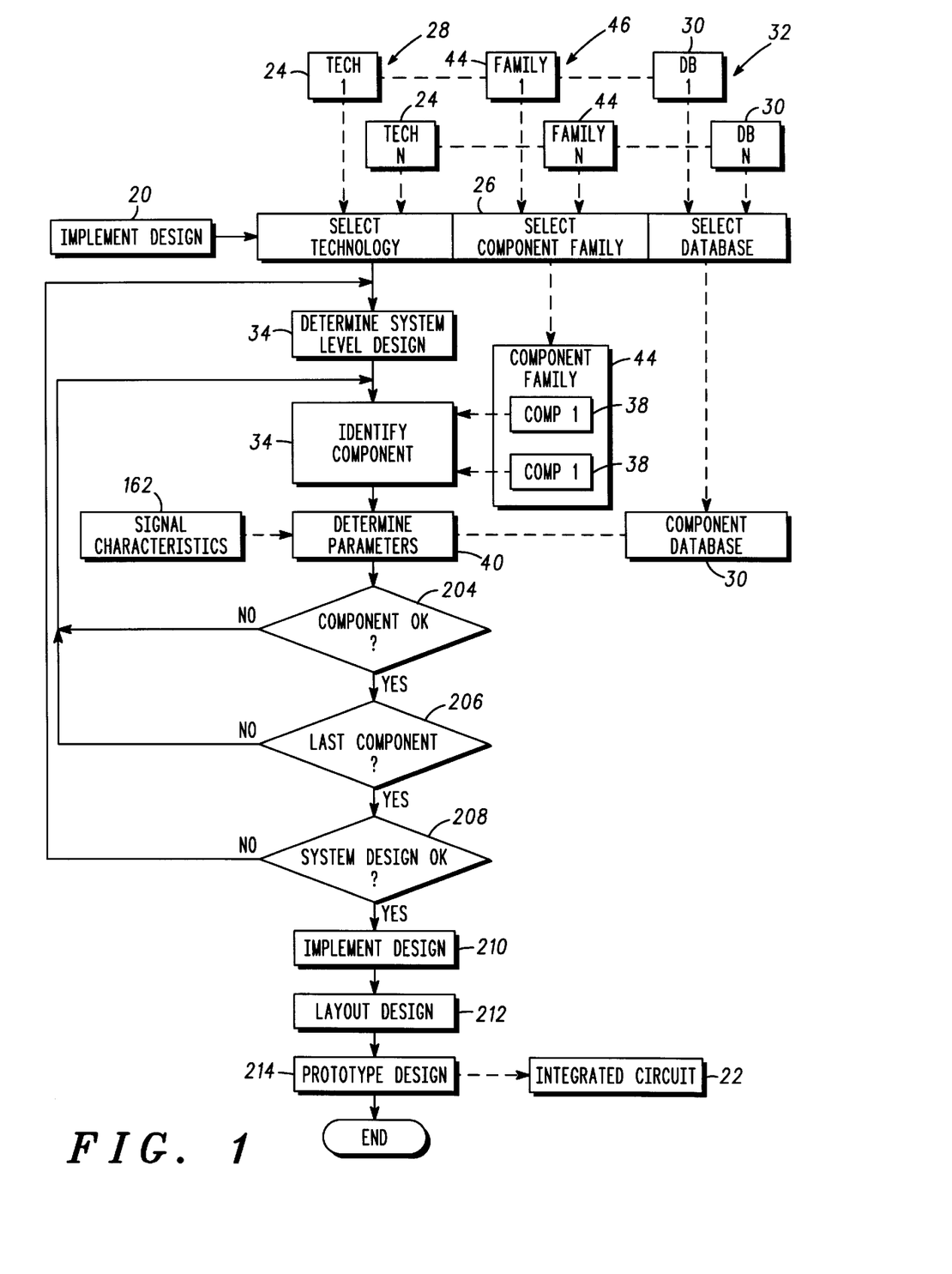
FIG. 1 shows a flow diagram of a process for the design of an exemplary integrated circuit in accordance with a preferred embodiment of the present invention.

FIG. 1 shows a flow diagram of a process 20 for the design and manufacture of an exemplary integrated circuit 22 in accordance with a preferred embodiment of the present invention. However, process 20 is not limited to use only in connection with integrated circuits, but may be applied to a wide range of digital circuits and electronic devices. Because of this, integrated circuit 22 may also be referred to as electronic device 22 or digital circuit 22 for the purposes of this discussion.

Utilizing a typical paradigm, the design of integrated circuit 22 passes through five levels: system, architecture, implementation, layout, and prototyping. At the system level, the designer conceives the design of integrated circuit 22 using a specific technology 24. Technology 24 may be defined by its architecture (CMOS, etc.), its photolithographic density (0.5 micron, etc.), or other characteristic.

Process 20 contains a selection task 26 in which a particular technology 24 for integrated circuit 22 is selected from among a library 28 of technologies 24. Each technology 24 in library 28 correlates to a family 44 of components 38 (discussed later) in a library 46 of families 44, and a database 30 (discussed later) in a library 32 of databases 30. When task 26 selects a specific technology 24 from library 28 it also selects a specific family 44 of components 38 from library 46 and a specific database 30 from library 32. The outputs of task 26 are selected family 44 of components 38 and selected database 30.

In a task 34, an appropriate system-level design is determined using conventional design techniques to fulfill the requirements of integrated circuit 22 under development. For example, during task 34 broadly specified functions are associated together. This design utilizes technology 24 selected in task 26. System-level design encompasses tasks 26 and 34.

At the architecture level, a task 36 of process 20 identifies, selects, and obtains a component 38 from family 44 of components 38 selected in task 26. Components 38 are the building blocks of integrated circuit 22 used to realize the design, e.g. adders, shifters, multipliers, etc. Components 38 are selected to achieve system level functions in a manner familiar to designers.

Figure 2:
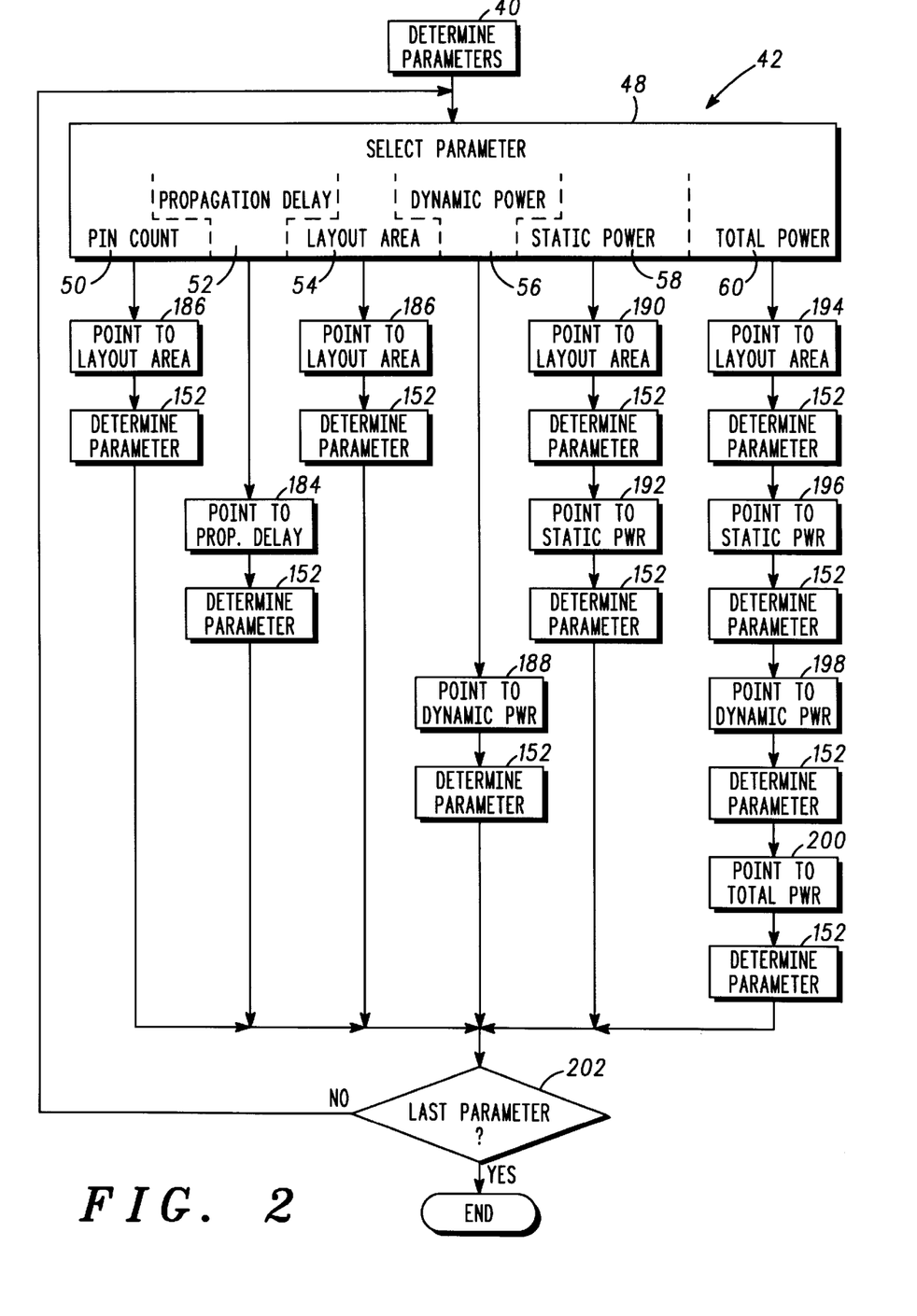
FIG. 2 shows a flow diagram of a process for the determination of parameters for a component of the integrated circuit in accordance with a preferred embodiment of the present invention.

Process 20 executes a process 40 following task 36 to select design parameters (discussed later) and determine the values of those design parameters. FIG. 2 shows a flow diagram of process 40 for the determination of design parameters 42 for component 38 (FIG. 1) of integrated circuit 22 (FIG. 1) in accordance with a preferred embodiment of the present invention. The following discussion refers to FIGS. 1 and 2.

A first task 48 in process 40 selects a specific design parameter 42 from among design parameters 42 available. In the preferred embodiment, design parameters 42 available are:

a) a pin count parameter 50, i.e. the number of pins or connections required of component 38;

b) a propagation delay parameter 52, i.e. the propagation delay required of the execution of component 38;

c) a layout area parameter 54, i.e. the area required of component 38 within integrated circuit 22;

d) a dynamic power parameter 56, i.e. the power consumed by component 38 as a function of the operation of component 38;

e) a static power parameter 58, i.e. the power consumed by component 38 due to the existence of component 38 without regard to the operation of component 38; and f) a total power parameter 60, i.e. the total power consumed by component 38 as a function of both the existence of component 38 and the operation of component 38.

Figure 3:
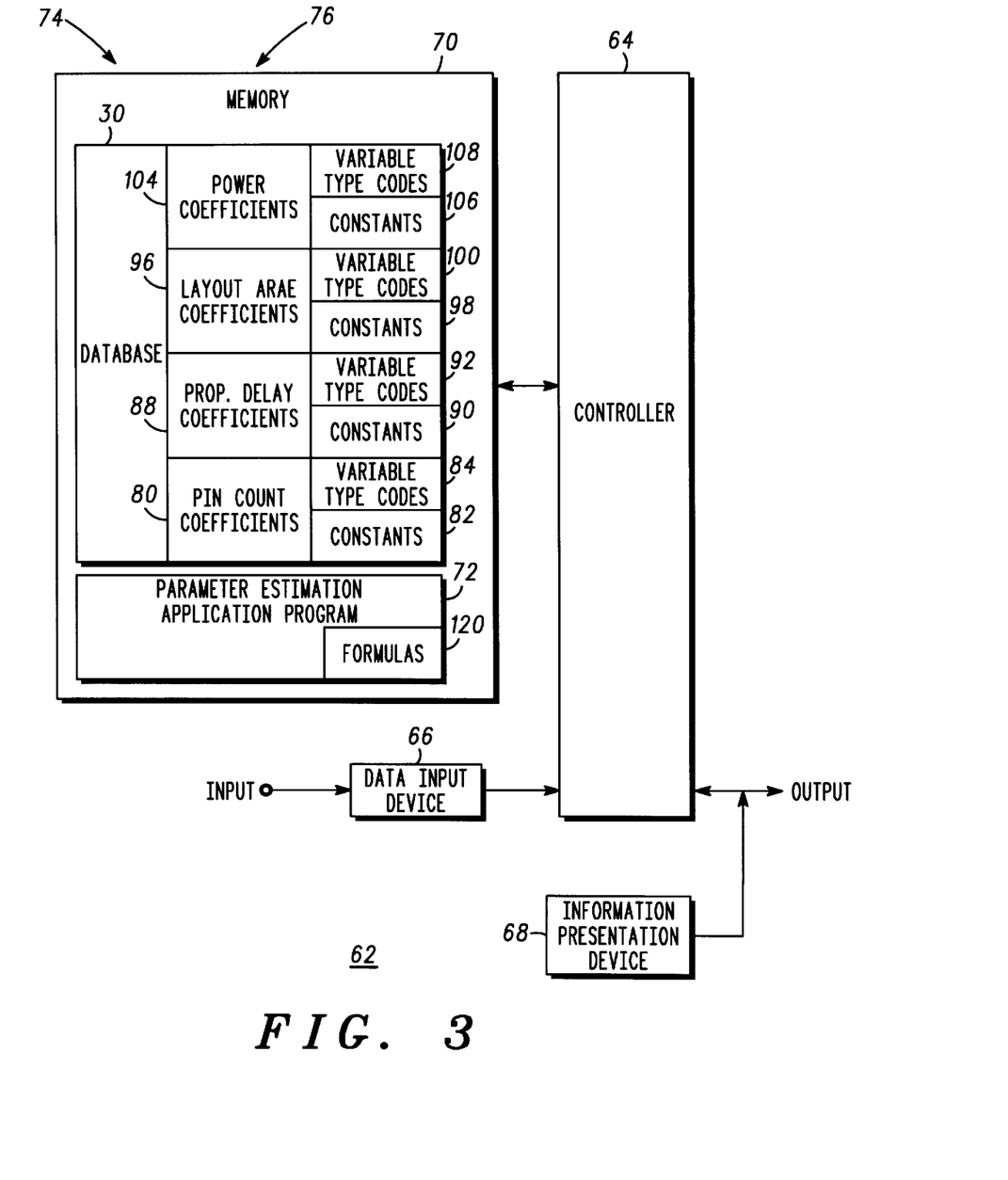
FIG. 3 shows a block diagram of a computer system design tool in accordance with a preferred embodiment of the present invention.
Figure 4:
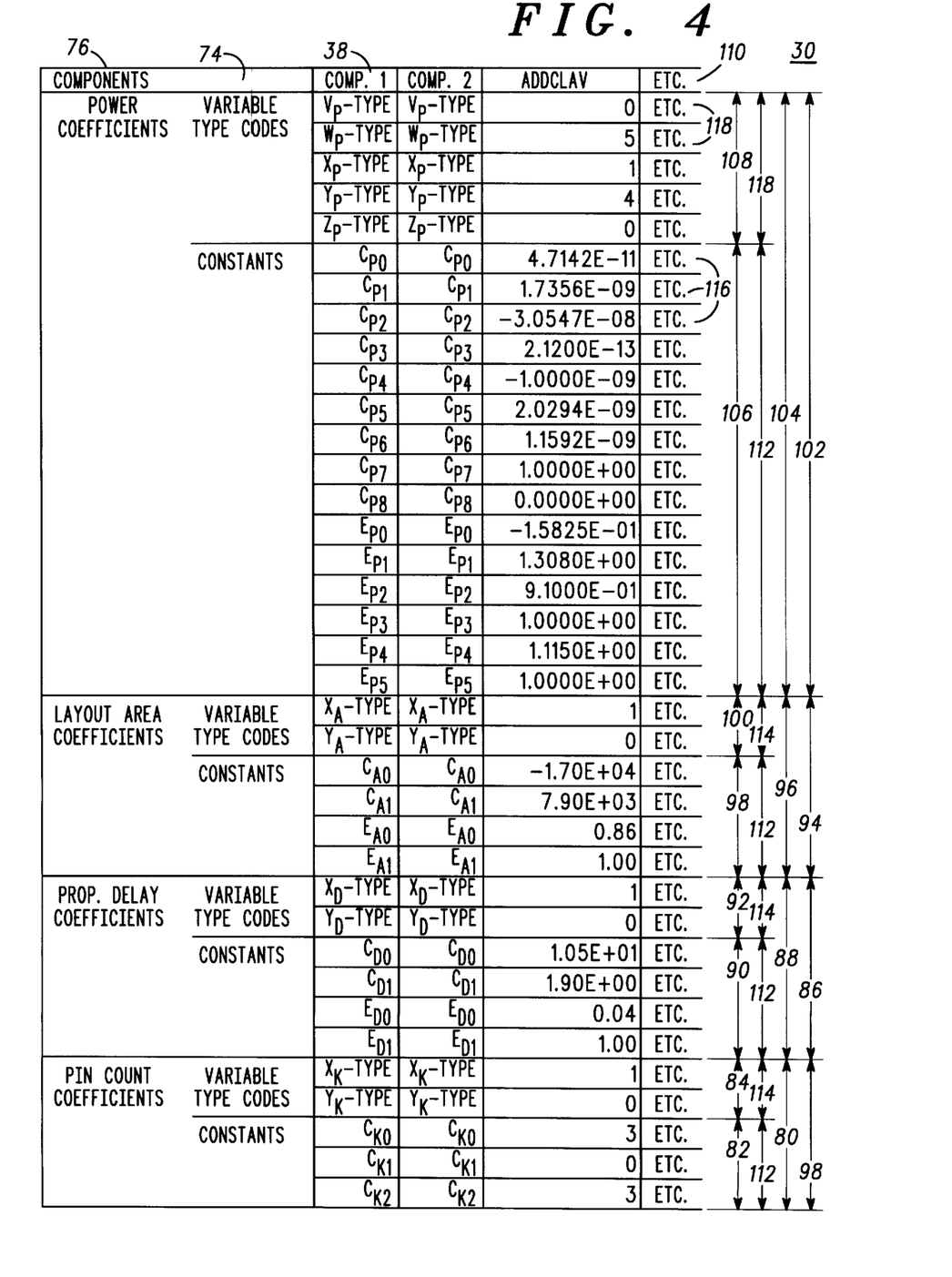
FIG. 4 shows a table depicting a memory data structure in accordance with a preferred embodiment of the present invention.

FIG. 3 shows a block diagram of a computer system design tool 62, and FIG. 4 shows a table depicting data structure 30 in memory 70 of design tool 62 in accordance with a preferred embodiment of the present invention. The following discussion refers to FIGS. 2, 3, and 4.

Design tool 62 contains a controller 64 coupled to a data input device 66, an information presentation device 68, and a memory 70.

Process 40 is executed upon computer system design tool 62 by means of a parameter estimation application program 72. Application program 72 is, in the preferred embodiment, contained in memory 70, having been placed there during the programming of computer system design tool 62.

Also contained in memory 70 is database 30. Database 30 is a data structure containing coefficients 74 for design parameters 42 in the form of a coefficients list 76. Coefficients list 76 is divided, in the preferred embodiment, into lists for each design parameter 42 as follows:

a) a count coefficients list 78, containing count coefficients 80 divided into count constants 82 and count variable type codes 84, for pin count parameter 50;

b) a delay coefficients list 86, containing delay coefficients 88 divided into delay constants 90 and delay variable type codes 92, for propagation delay parameter 52;

c) an area coefficients list 94, containing area coefficients 96 divided into area constants 98 and area variable type codes 100, for layout area parameter 54; and d) a power coefficients list 102, containing power coefficients 104 divided into power constants 106 and power variable type codes 108, for dynamic power parameter 56, static power parameter 58, and total power parameter 60.

Referring to FIG. 1, coefficients 74 are derived empirically. Each integrated circuit 22 has a corresponding database 30 containing coefficients 74 peculiar to components 38 for that integrated circuit 22. During the creation of each database 30, a conventional power analysis tool is used to simulate each component 38 peculiar to the specific technologies from which various integrated circuits 22 are to be designed. The resultant data obtained as a result of this simulation is then converted into coefficients 74 for formulas 120 to be used in the prediction and determination of design parameters 42 of each component 38. Coefficients 74 are then placed in database 30. Each database 30 then contains coefficients for a family 44 of components 38 peculiar to a specific technology. Components 38 may then be used to design a particular integrated circuit 22 in that technology.

Referring back to FIGS. 2, 3, and 4, database 30 also contains, in the preferred embodiment, a list 110 of components 38 linked to coefficients list 76. Those skilled in the art will recognize that list 110 is not required, and that position alone in database 30 is sufficient to determine coefficients 74 for any given parameter 42 of any given component 38. List 110 is included herein for clarity.

From a differing point of view, list 76 of coefficients 74, is divided into two lists: a constant coefficients list 112 and a variable type codes list 114. Constant coefficients list 112 contains constant coefficients (constants) 116 for design parameters 42. Similarly, variable type codes list 114 contains variable type codes 118 for design parameters 42.

Figure 5:
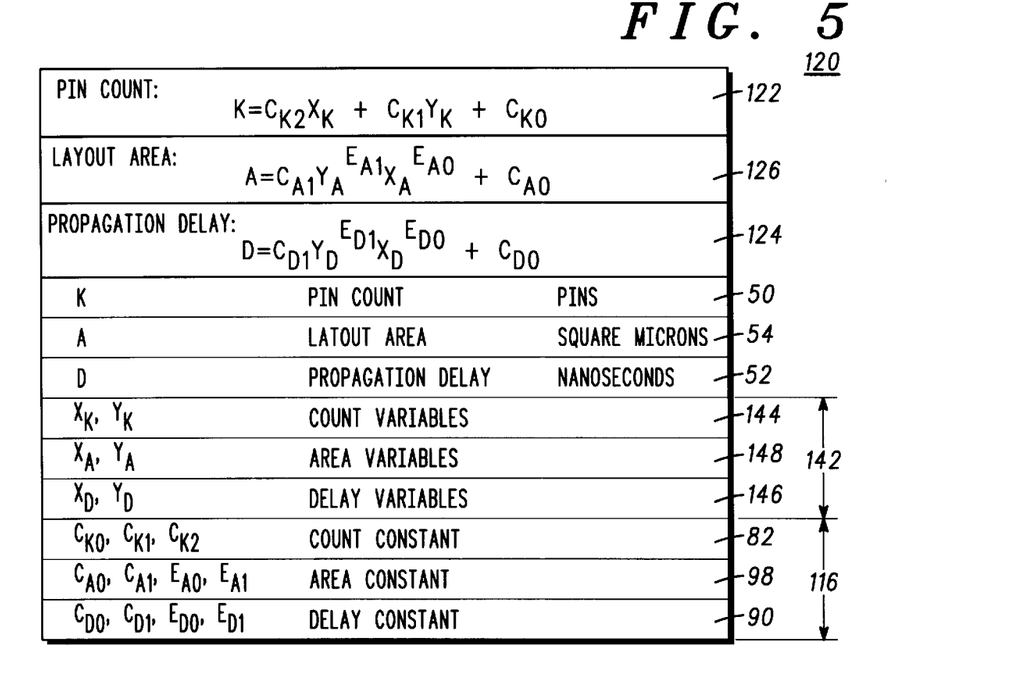
FIG. 5 shows a table depicting formulas describing pin count, layout area, and propagation delay for the component of the integrated circuit in accordance with a preferred embodiment of the present invention.
Figure 6:
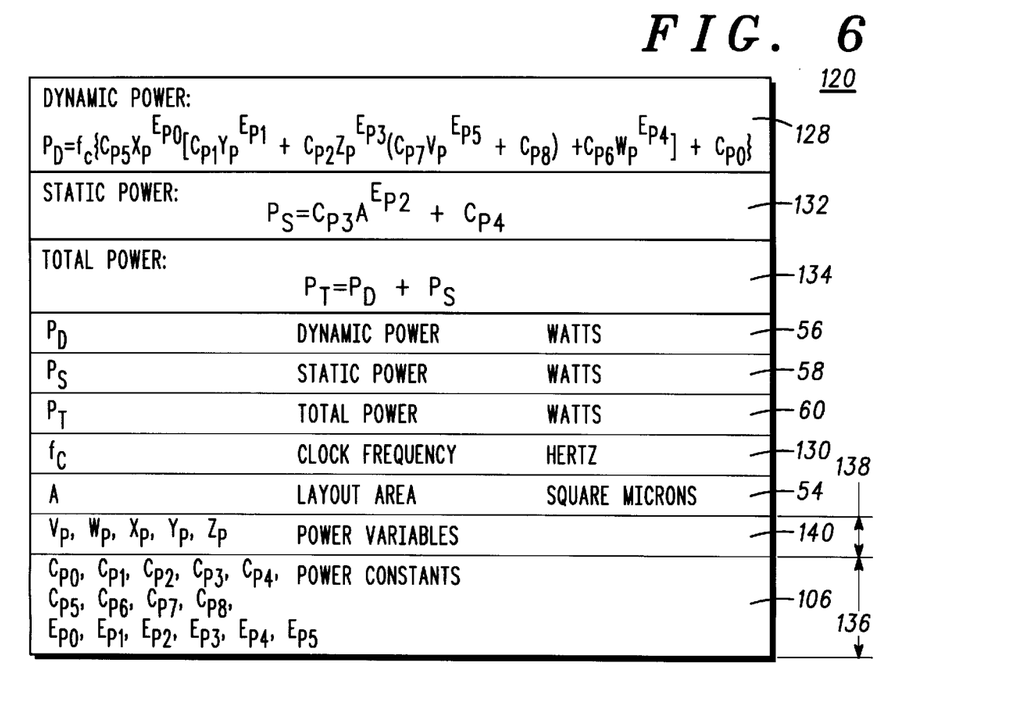
FIG. 6 shows a table depicting formulas describing dynamic, static, and total powers for the component of the integrated circuit in accordance with a preferred embodiment of the present invention.

FIGS. 5 and 6 show tables depicting formulas 120 describing pin count, layout area, propagation delay, dynamic power, static power, and total power for component 38 of integrated circuit 22 in accordance with a preferred embodiment of the present invention. The following discussion refers to FIGS. 3 through 6.

Formulas 120, in the preferred embodiment, are contained within and are a part of parameter estimation application program 72. As such, formulas 120 are contained in memory 70.

Computer system design tool 62 utilizes formulas 120 to determine the values of design parameters 42. Formulas 120 have coefficients 74 which enable formulas 120 to predict design parameters 42 with reasonable accuracy. Just as the preferred embodiment has six design parameters 42, so does it have six formulas 120, one for each design parameters 42:

a) a count formula 122 with count coefficients 80 for the prediction of pin count parameter 50;

b) a delay formula 124 with delay coefficients 88 for the prediction of propagation delay parameter 52;

c) an area formula 126 with area coefficients 96 for the prediction of layout area parameter 54;

d) a dynamic power formula 128 with power coefficients 104 and a clock frequency 130 for the prediction of dynamic power parameter 56;

e) a static power formula 132, encompassing area formula 126, with area coefficients 96 and power coefficients 104 for the prediction of static power parameter 58; and f) a total power formula 134, encompassing static power formula 132 and dynamic power formula 128, with area coefficients 96, power coefficients 104, and clock frequency 130 for the prediction of total power parameter 60.

Formulas 120 utilize two types of coefficients to determine design parameters 42: constants 116 and variable coefficients (variables) 142. For example, dynamic power formula 128 (FIG. 6) utilizes constants 116 contained in a list 136 of power constants 106 and variables contained in a list 138 of power variables 140. In a similar manner, count formula 122 utilizes count constants 82 and count variables 144, delay formula 124 utilizes delay constants 90 and delay variables 146, and area formula 126 utilizes area constants 98 and area variables 148.

Constants 116 do not change for a specific design parameter 42 for a specific component 38. Constants 116, then, are contained in database 30 and extracted as required by application program 72 running on computer system design tool 62.

Variables 142, on the other hand, have values determined by both variable type codes 118, contained in database 30, and by input conditions (to be discussed later).

Returning to process 40, the following discussion refers to FIG. 2.

In selection task 48 of process 40, the designer selects which design parameter 42 of component 38 is to be determined. Task 48, in conjunction with a decision task (discussed later), may be executed multiple times within process 40. Each design parameter 42, therefore, may be determined as a result of a separate execution of task 48. Indeed, multiple determination of a given design parameter 42 may be made as required by the designer.

Assuming, for the purposes of example and simplicity, that selection task 48 has selected pin count parameter 50 as design parameter 42 to be determined, a pointer task 150 establishes pointers to pin count coefficients 80 (FIGS. 3 and 4) in database 30 and to pin count formula 122 (FIG. 5) in application program 72.

Figure 7:
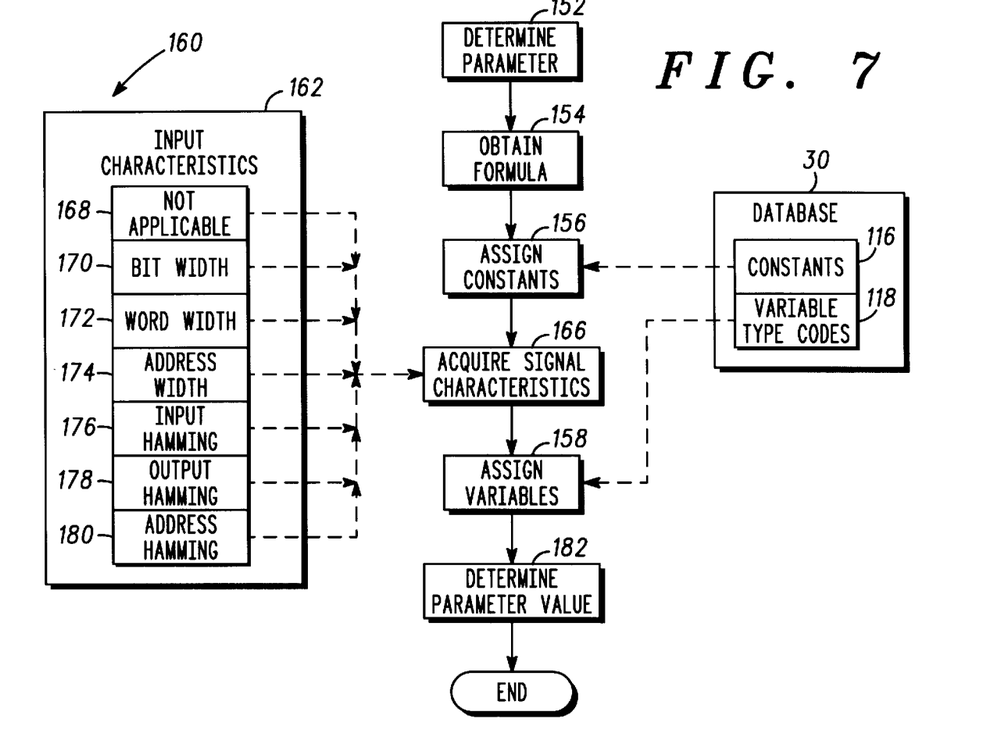
FIG. 7 shows a flow diagram of an exemplary process for the determination of a parameter in accordance with a preferred embodiment of the present invention.

FIG. 7 shows a flow diagram of an exemplary process 152, called by process 40 after task 150, for the determination of design parameter 42 pointed to by task 150 in accordance with a preferred embodiment of the present invention. The following discussion refers to FIG. 7.

Process 152 is a generic process. That is, all tasks within process 152 act upon, through, or with the specific formula 120 and coefficients 74 (FIGS. 3 through 6) pointed to by a pointer task (FIG. 2) executed immediately prior to process 152. Process 152 is independently executed for each design parameter 42 to be determined. Detailed operation of process 152 is explained herein generically. The operation of process 152 is also explained herein in terms of pin count parameter 50, being the design parameter 42 pointed to by pointer task 150.

A task 154 of process 152 obtains the formula 120 pointed to by the pointer task. For pin count parameter 50, task 154 obtains count formula 122 (FIG. 5).

A task 156 of process 152 then assigns constants 116, pointed to by the pointer task, to formula 120 obtained in task 154. For pin count parameter 50, task 156 realizes constants 116 by extracting count constants 82 (FIGS. 3 and 4) from database 30 and allocating them to count formula 122 (FIG. 5). The extracted count constants 82 describe the subject component 38 (FIG. 1) being evaluated by process 20 (FIG. 2).

Figure 8:
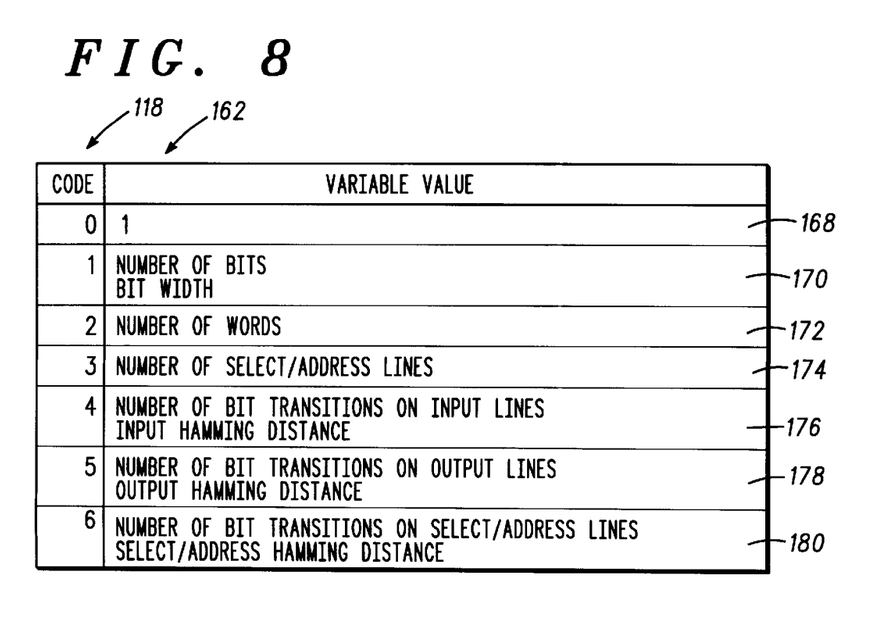
FIG. 8 shows a table depicting variable type codes in accordance with a preferred embodiment of the present invention.

FIG. 8 shows a table depicting variable type codes 118 in accordance with a preferred embodiment of the present invention. The following discussion refers to FIGS. 7 and 8.

A task 166 acquires signal characteristics 162. Signal characteristics 162 are input items obtained from the designer through data input device 66 (FIG. 3) and may be directly obtained during task 166 from a list 160 (FIG. 7) of input items 162. In the preferred embodiment, data input device 66 is a keyboard, but may be any of numerous other devices well known to those skilled in the art.

In the preferred embodiment, seven variable type codes 118 are used to determine which signal characteristics 162 are assigned as values to variables 142 of formula 120.

If variable type code 118 is 0, then variable 142 is not applicable to formula 120. In this case, a value of 1 is assigned to variable 142, which effectively removes it from formula 120.

If variable type code 118 is 1, then variable 142 has a value equivalent to bit width (the number of bits or data lines) 170 of component 38 (FIG. 1). For example, if component 38 were a 20-bit adder, bit width 170 and the value of variable 142 would be 20.

If variable type code 118 is 2, then variable 142 has a value equivalent to word width (the number of words) 172 of component 38 (FIG. 1). For example, if component 38 were a doubleword comparator, word width 172 and the value of variable 142 would be 2.

If variable type code 118 is 3, then variable 142 has a value equivalent to address width (the number of address and/or select lines) 174 of component 38 (FIG. 1). For example, if component 38 were a 64 Kilobyte gate array, address width 174 and the value of variable 142 would be 16.

If variable type code 118 is 4, then variable 142 has a value equivalent to input hamming distance (the number of bit transitions on the input data lines) 176 of component 38 (FIG. 1). For example, if component 38 were a 20-bit adder and the input to component 38 were to transition from $F3EB4_{16}$ to $7D697_{16}$, input hamming distance 176 and the value of variable 142 would be 7.

If variable type code 118 is 5, then variable 142 has a value equivalent to output hamming distance (the number of bit transitions on the output data lines) 178 of component 38 (FIG. 1). For example, if component 38 were a 20-bit adder and the output from component 38 were to transition from $3AF1C_{16}$ to $963C2_{16}$, output hamming distance 178 and the value of variable 142 would be 12.

If variable type code 118 is 6, then variable 142 has a value equivalent to address hamming distance (the number of bit transitions on the address and/or select lines) 180 of component 38 (FIG. 1). For example, if component 30 were a 64 Kilobyte gate array and the address for component 38 were to transition from $3412_{16}$ to $48F6_{16}$, address hamming distance 180 and the value of variable 142 would be 9.

A task 158 of process 152 utilizes variable type codes 118, pointed to by the pointer task, to select one input item 162, from list 160 of input items 162 acquired in task 166, for each variable 142 of formula 120 obtained in task 154. For pin count parameter 50, task 158 extracts count variable type codes 84 (FIGS. 3 and 4) from database 30, then utilizes each count variable type code 84 (FIGS. 3 and 4) to determine which of input items 162 to define as the value of respective count variable 144 (FIG. 5) of count formula 122 (FIGS. 5 and 6).

After task 158, a task 182 of process 152 utilizes formula 120 to determine the value of design parameter 42. For pin count parameter 50, task 182 utilizes count formula 122 to determine the value of pin count parameter 50 by performing the mathematical operations indicated by formula 122.

This completes process 152, and control is returned to the following task in process 40 (FIG. 2). For pin count parameter 50, control is returned to a task 202.

Referring to FIG. 2, since the pointer task described above is task 150, process 40 pointed to pin count parameter 50, the value of which was determined by process 152 utilizing count formula 122. Count formula 122 is responsive to bit width 170 and address width 174. Presuming, for the sake of example, that component 38 (FIG. 1) is a 20-bit adder with carry, look-ahead, and overflow (an ADDCLAV, see FIG. 4.), count formula 122 would be processed as follows:

$K=C_{K2}X_K+C_{K1}Y_K+C_{K0}$ $K=3X_K+0Y_K+3$ $K=3*20+0*1+3$ $K=63$ pins.

An extensive selection of components 38 is desirably defined by database 30 (FIG. 3), and process 40 need not determine parameters only for an ADDCLAV component 38.

If selection task 48 of process 40 has selected propagation delay parameter 52, a pointer task 184 establishes pointers to delay coefficients 88 (FIGS. 3 and 4) in database 30 and to delay formula 124 (FIG. 5) in application program 72. Process 40 then executes process 152 (described above) to determine the value of propagation delay parameter 52. Delay formula 124 is responsive to bit width 170 and address width 174. For the ADDCLAV component 38, delay formula 124 is processed as follows:

$D=C_{D1}Y_D^{ED1}X_D^{ED0}+C_{D0}$ $D=1.9*Y_D^{1}*X_D^{1}*X_D^{0.4}+10.5$ $D=1.9*1^{1}*20^{0.4}+10.5$ $D=16.8$ nanoseconds.

Again, if selection task 48 of process 40 has selected layout area parameter 54, a pointer task 186 establishes pointers to area coefficients 96 (FIGS. 3 and 4) in database 30 and to area formula 126 (FIG. 5) in application program 72. Process 40 then executes process 152 (described above) to determine the value of layout area parameter 54. Area formula 126 is responsive to bit width 170 and address width 174. For the ADDCLAV component 38, area formula 126 is processed as follows:

$A=C_{A1}Y_A^{EA1}X_A^{EA0}+C_{A0}$ $A=7900*Y_A^{1}*X_A^{0.86}+(-17000)$ $A=7900*1^{1}*20^{0.86}-17000$ $A=86,875$ square microns.

Yet again, if selection task 48 of process 40 has selected dynamic power parameter 56, a pointer task 188 establishes pointers to power coefficients 104 (FIGS. 3 and 4) in database 30 and to dynamic power formula 128 (FIG. 6) in application program 72. Process 40 then executes process 152 (described above) to determine the value of dynamic power parameter 56. Dynamic power formula 128 is responsive to bit width 170, address width 174, input hamming distance 176, output hamming distance 78, and address hamming distance 180. For the ADDCLAV component 38 in integrated circuit 22 operating at clock frequency 130 of 10 MHz, dynamic power formula 128 is processed as follows:

$P_D =$ $f_c\{C_{P5}X_P^{EP0}[C_{P1}Y_P^{EP1} + C_{P2}Z_P^{EP3}(C_{P7}V_P^{EP5} + C_{P8}) + C_{P6}W_P^{EP4}] + C_{P0}\}$ $P_D = (10*10^6)\{(2.0294*10^{-3})X_P^{-0.15825}[(1.7356*10^{-9})Y_P^{1.308} +$ $(-3.0547*10^{-8})Z_P^{1}(1V_P^{1} + 0) + (1.1592*10^{-9})W_P^{1.115}] +$ $(4.7142*10^{-11})\}$ $P_D = (10*10^6)\{(2.0294*10^{-3})20^{-0.15825}[(1.7356*10^{-9})17^{1.308} +$ $(-3.0547*10^{-8})1^{1}(1*1^{1} + 0) + (1.1592*10^{-9})12^{1.115}] +$ $(4.7142*10^{-11})\}$ $P_D = 1.210$ milliwatts.

It should be noted that in dynamic power formula 128 (FIG. 6), two of power variables 140, $W_P$ and $Y_P$, are dependent upon input items 162 input hamming code 176 and output hamming code 178, respectively. These are dynamic conditions, and are exampled randomly. Those skilled in the art may utilize statistical approaches to determine the most relevant values for design parameters 42 with dynamic terms. This statistical approach need be no more complicated, for example, than assuming 20, 50, and 80 per cent bit transitions to achieve an approximately minimal, mean, and maximal value.

If selection task 48 of process 40 has selected static power parameter 58, then, because static power formula 132 (FIG. 6) contains layout area parameter 54 as one of its terms, a pointer task 190 establishes pointers to area coefficients 96 (FIGS. 3 and 4) in database 30 and to area formula 126 (FIG. 5) in application program 72. Process 40 then executes process 152 to determine the value of layout area parameter 54. The determination of layout area parameter 54 is described and exampled above. A pointer task 192 next establishes pointers to power coefficients 106 (FIGS. 3 and 4) in database 30 and to static power formula 132 (FIG. 6) in application program 72. Process 40 then executes process 152 (described above) to determine the value of static power parameter 58, processing static power formula 132 for the ADDCLAV component 38 as follows:

$P_S=C_{P3}A^{EP2}+C_{P4}$ $P_S=(2.12*10^{-13})A^{0.91}+(-1*10^{-9})$ $P_S=(2.12*10^{-13})(8.6875*10^4)^{0.91}+(-1*10^{-9})$ $P_S=5.6$ nanowatts.

If selection task 48 of process 40 has selected total power parameter 60, then, because total power formula 134 (FIG. 6) contains static power parameter 58 and dynamic power parameter 56 as its terms, a pointer task 194 establishes pointers to area coefficients 96 (FIGS. 3 and 4) in database 30 and to area formula 126 (FIG. 5) in application program 72. Process 40 then executes process 152 to determine the value of layout area parameter 54. The determination of layout area parameter 54 is described and exampled above. Next, a pointer task 196 establishes pointers to power coefficients 106 (FIGS. 3 and 4) in database 30 and to static power formula 132 (FIG. 6) in application program 72. Process 40 then executes process 152 to determine the value of static power parameter 58. The determination of static power parameter 56 is described and exampled above. Next, a pointer task 198 then establishes pointers to power coefficients 104 (FIGS. 3 and 4) in database 30 and to dynamic power formula 128 (FIG. 6) in application program 72. Process 40 then executes process 152 to determine the value of dynamic power parameter 56. The determination of dynamic power parameter 58 is described and exampled above. Next, a pointer task 200 establishes pointers to total power formula 134 (FIG. 6) in application program 72. Process 40 then executes process 152 (described above) to determine the value of total power parameter 60, processing total power formula 134 for the ADDCLAV component 38, in integrated circuit 22 operating at clock frequency 130 of 10 MHz, as follows:

$P_T=P_D+P_S$ $P_T=1.21*10^{-3}+5.6*10^{-9}$ $P_T=1.21$ milliwatts (approximately).

While static power parameter 58 is an insignificant part of total power parameter 60 in the ADDCLAV example above, those skilled in the art will recognize that this is not necessarily the case for all components 38 of all integrated circuits 22.

Once process 40 has determined design parameter 42 selected in selection task 48, a decision task 202 decides if another design parameter 42 is to be determined. Decision task 202 permits the designer to determine a multiplicity of design parameters 42, including variations of dynamic power parameter 56 and total power parameter 60 with which to establish a range of powers for component 38. It is this multiplicity of predicted design parameters 42 that allows the designer to make a knowledgeable decision vis-à-vis the suitability of component 38. Alternatively, task 202 may be configured to automatically cycle through all parameters 42 for component 38.

If task 202 determines that another design parameter 42 is to be determined, then control reverts back to selection task 48. Task 48 is repeated to select the desired design parameter 42, an appropriate pointer task is performed, and tasks 154, 156, 166, 158, and 182 (FIG. 7) of process 152 are repeated for that design parameter 42.

Once task 202 has determined that all desired design parameters 42 have been determined, then process 40 has been completed and control passes back to process 20 (FIG. 1).

Referring to FIG. 1, process 40 is followed by a decision task 204 of process 20 which decides if design parameters 42 of component 38 indicate that component 38 is an appropriate choice for integrated circuit 22. If, upon inspection of design parameters 42 of component 38, the designer determines that component 38 is not an appropriate choice for the design under development, then control reverts back to task 36. Task 36 and process 40, along with all tasks within process 40, are repeated for another component 38. This continues until decision task 204 determines that component 38 is an appropriate choice for integrated circuit 22.

Decision task 204 is followed by decision task 206, which decides if all components 38 of integrated circuit 22 under development have been identified and selected. If no, then control reverts back to task 36. Task 36 and process 40, along with all tasks within process 40, are repeated for a next component 38. Because there may be some interaction between components 38, task 206 gives the designer an opportunity to reselect a previously selected component 38. In this manner, the designer may modify the design of integrated circuit 22 in response to total power consumption parameters 60 and other design parameters 42, either independently or cumulatively, as required. Since this modification takes place at the architecture level, the cost of modification is significantly lower than traditional design methodologies.

After decision task 206 has determined that the last component 38 of integrated circuit 22 has been identified and selected, a decision task 208 decides if the overall design of integrated circuit 22 is as desired. Decision task 208 represents a step not available to designers utilizing traditional design methodologies: the ability to modify a design at the system level should that design prove to be less that optimal based upon accurate predictions of design parameters 42 for each component 38 of the integrated circuit under development. Should the designer decide in decision task 208 that the design should be modified, control reverts back to task 34 and the design re-evaluated and determined accordingly. Tasks 34 and 36, process 40, and tasks 204, 206, and 208 are repeated until task 208 decides the design is appropriate.

In tasks 204, 206, and 208, feedback, in the form of design parameter values, is provided at information presentation device 68 (FIG. 3), controlling the output thereof, and presented to the designer. In the preferred embodiment, information presentation device 68 is a video display terminal and/or printer, but may be any of numerous other devices well known to those skilled in the art. Data input device 66 (previously discussed) and information presentation device 68 provide the interface between the designer and computer system design tool 62.

Following decision task 208, a task 210 of process 20 is executed in which interconnections between components 38 of integrated circuit 22 are created to produce a homogenous circuit in a manner well known to those skilled in the art. Task 210 represents the implementation level of the design of integrated circuit 22.

In a task 212, integrated circuit 22 is laid out, and the masks are created from which integrated circuit 22 will be produced. Task 212 represents the layout level of the design of integrated circuit 22. At this level, conventional power analysis tools may be used to again determine power consumption, but this is not a requirement of the present invention.

Finally, in a task 214 a prototype integrated circuit 22 is constructed in response to the design interactively modified in tasks 34 and 36, process 40, and tasks 204, 206, and 208. This interactive modification, specifically the accurate prediction of design parameters 42 at the architecture level allows integrated circuit 22 to be constructed at the prototyping level with a high probability of being optimal for the requisite task.

In summary, the interactive design and modification methodology described herein, specifically the accurate prediction of design parameters 42 for each component 38 of integrated circuit 22 at the architecture level, allows integrated circuit 22 to be constructed at the prototyping level with a high probability of being optimal for the requisite task. Since the layout and prototyping levels demand the greater portion of the cost of the development of integrated circuit 22, this methodology significantly reduces that cost. Additionally, the system and architecture design levels represent the "soft" levels, where the design is still in the form of symbols and figures. The layout and prototyping design levels, on the other hand, represent "hard" levels, with physical resources committed to the design. The modification of the design at the system and architecture levels represent an additional savings in committed resources and manpower.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for designing an electronic device, said method comprising:

identifying an architectural component of said electronic device;

obtaining, in response to said identified architectural component, a power formula which describes a power consumption parameter of said architectural component, said power consumption parameter being a first parameter, wherein said power formula comprises a generalized power formula based on an address width and a bit width of said architectural component;

acquiring signal characteristics for said identified architectural component;

determining said power consumption parameter in response to said obtained power formula and said architectural component signal characteristics; and using said power consumption parameter to design the electronic device.

2. A method as claimed in claim 1 wherein said power formula has power coefficients for predicting said power consumption parameter, and said method additionally comprises the step of realizing said power coefficients in response to said obtained power formula.

3. A method as claimed in claim 2 wherein said power coefficients include constant power coefficients and variable power coefficients, and said realizing step comprises:

allocating, to said constant power coefficients, values contained in a database, said database being associated with said architectural component; and assigning, to said variable power coefficients, values determined in response to said signal characteristics.

4. A method as claimed in claim 3 wherein said assigning step comprises the steps of:

defining said signal characteristics in a list of input items;

extracting, from said database, a variable type code for one of said variable power coefficients;

selecting, through said variable type code, one of said input items in said input item list; and assigning, to said one variable power coefficient, a value for said selected input item.

5. A method as claimed in claim 1 additionally comprising repeating said identifying, obtaining, and determining steps for another architectural component of said electronic device.

6. A method as claimed in claim 1, the method further comprising:

selecting a second design parameter to be determined;

obtaining a formula which describes said second design parameter for said architectural component; and determining said second design parameter in response to said formula and said architectural component signal characteristic.

7. A method as claimed in claim 1 wherein said power formula is configured so that said power consumption parameter is responsive to a static power consumption parameter and a dynamic power consumption parameter, and wherein:

said static power consumption parameter corresponds to power consumed by said architectural component as a function of existence of said architectural component, without regard to operation of said architectural component; and said dynamic power consumption parameter corresponds to power consumed by said architectural component, in addition to said static power, which is a function of operation of said architectural component.

8. A method as claimed in claim 1 wherein said architectural component is a digital circuit, and said acquiring comprises:

obtaining a bit width of said digital circuit, said bit width being one of said signal characteristics;

obtaining an input hamming distance of said digital circuit, said input hamming distance bring another of said signal characteristics; and obtaining an output hamming distance of said digital circuit, said output hamming distance being another of said signal characteristics.

9. A method as claimed in claim 8 wherein said acquiring additionally comprises:

obtaining an address width of said digital circuit, said address width being another of said signal characteristics; and obtaining an address hamming distance of said digital circuit, said address hamming distance being another of said signal characteristics.

10. A method as claimed in claim 1 additionally comprising:

obtaining, in response to said identified architectural component, a delay formula which describes a propagation delay parameter of said architectural component, said propagation delay parameter being one of said design parameters, and said delay formula being responsive to a bit width and an address width of said architectural component; and determining said propagation delay parameter in response to said obtained delay formula.

11. A method as claimed in claim 1 additionally comprising:

obtaining, in response to said identified architectural component, an area formula which describes a layout area parameter of said architectural component, said layout area parameter being one of said design parameters, and said area formula being responsive to a bit width and an address width of said architectural component; and determining said layout area parameter in response to said obtained area formula.

12. A method as claimed in claim 1 additionally comprising:

obtaining, in response to said identified architectural component, a count formula which describes a pin count parameter of said architectural component, said pin count parameter being one of said design parameters, and said count formula being responsive to a bit width and an address width of said architectural component; and determining said pin count parameter in response to said obtained count formula.

13. A method as claimed in claim 1 additionally comprising controlling an information presentation device in response to said power consumption parameter determined in said determining step.

14. A method as claimed in claim 1 additionally comprising:

modifying a design of said electronic device in response to said power consumption parameter determined in said determining step; and constructing said electronic device in response to said modified device design.

15. A design tool for use in producing an integrated circuit having a power-consumption optimized design, said design tool comprising:

a data input device for obtaining characteristics of signals processed by said integrated circuit;

a controller, coupled to said data input device, said controller being configured to identify a component of said integrated circuit, obtain a power formula describing a power consumption parameter for said component, and determine said power consumption parameter in response to said power formula and said signal characteristics, wherein said component has an architecture defined by an address width and a bit width, and wherein said power formula is based on said address width and said bit width of said component; and an information presentation device coupled to said controller and configured to be responsive to said determined power consumption parameter for providing feedback to guide production of aid integrated circuit having said power-consumption optimized design.

16. A design tool as claimed in claim 15 additionally comprising a memory for storing data to be accessed by said controller, said memory comprising a data structure stored in said memory, said data structure comprising a list of power coefficients for said component.

17. A design tool as claimed in claim 16 wherein said power coefficients define said power formula.

18. A design tool as claimed in claim 16 wherein said list of power coefficients comprises:

a list of power constants; and a list of variable type codes.

* * * * *